Patented Oct. 16, 1928.

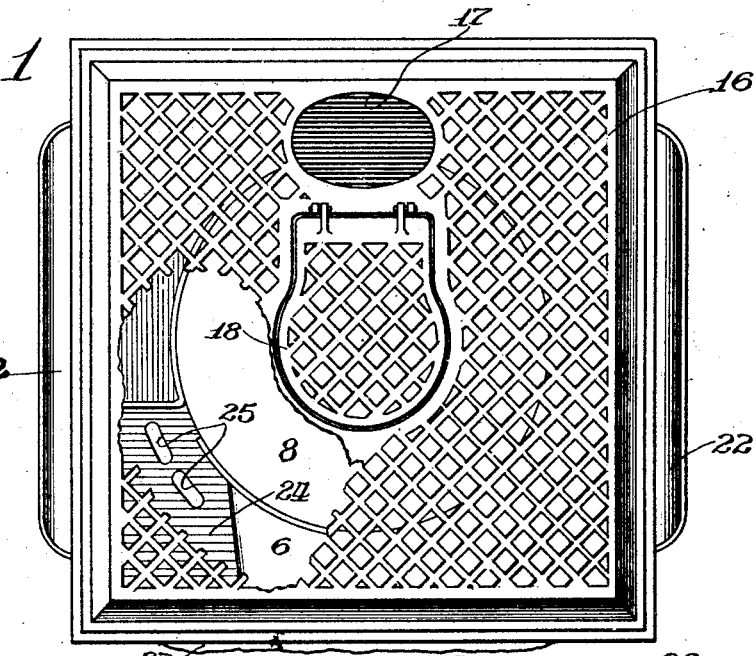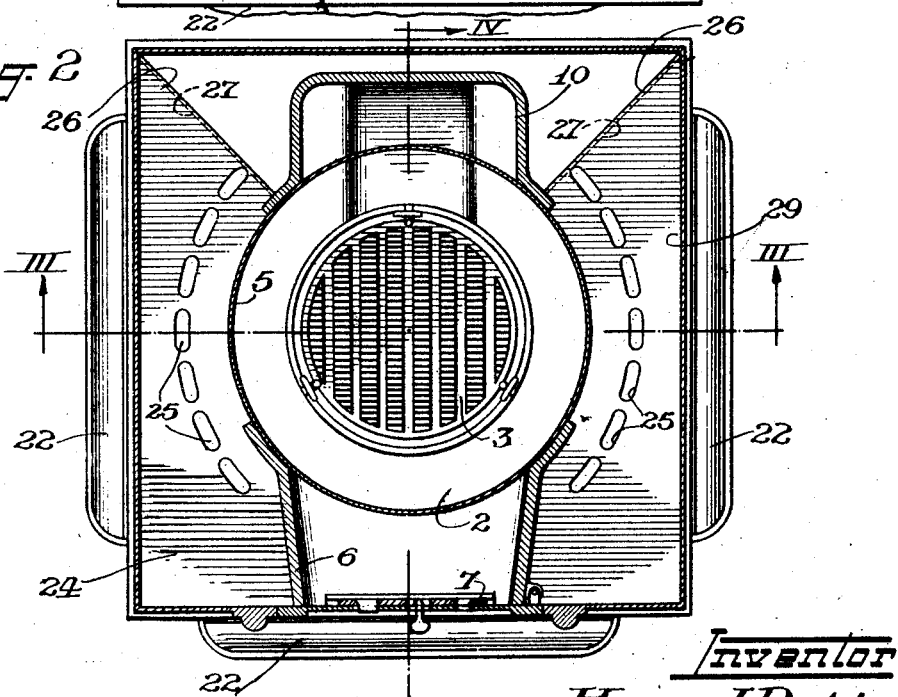

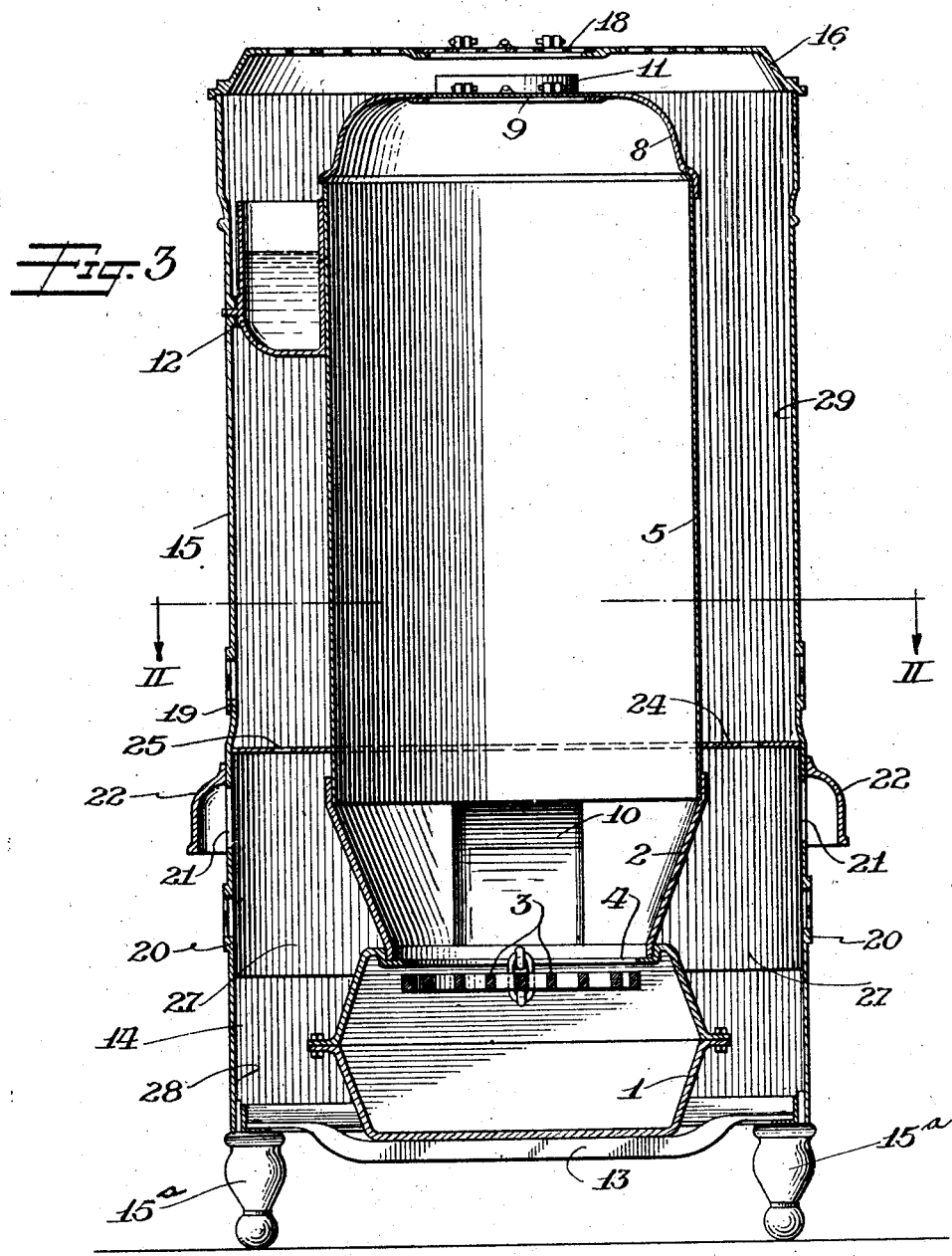

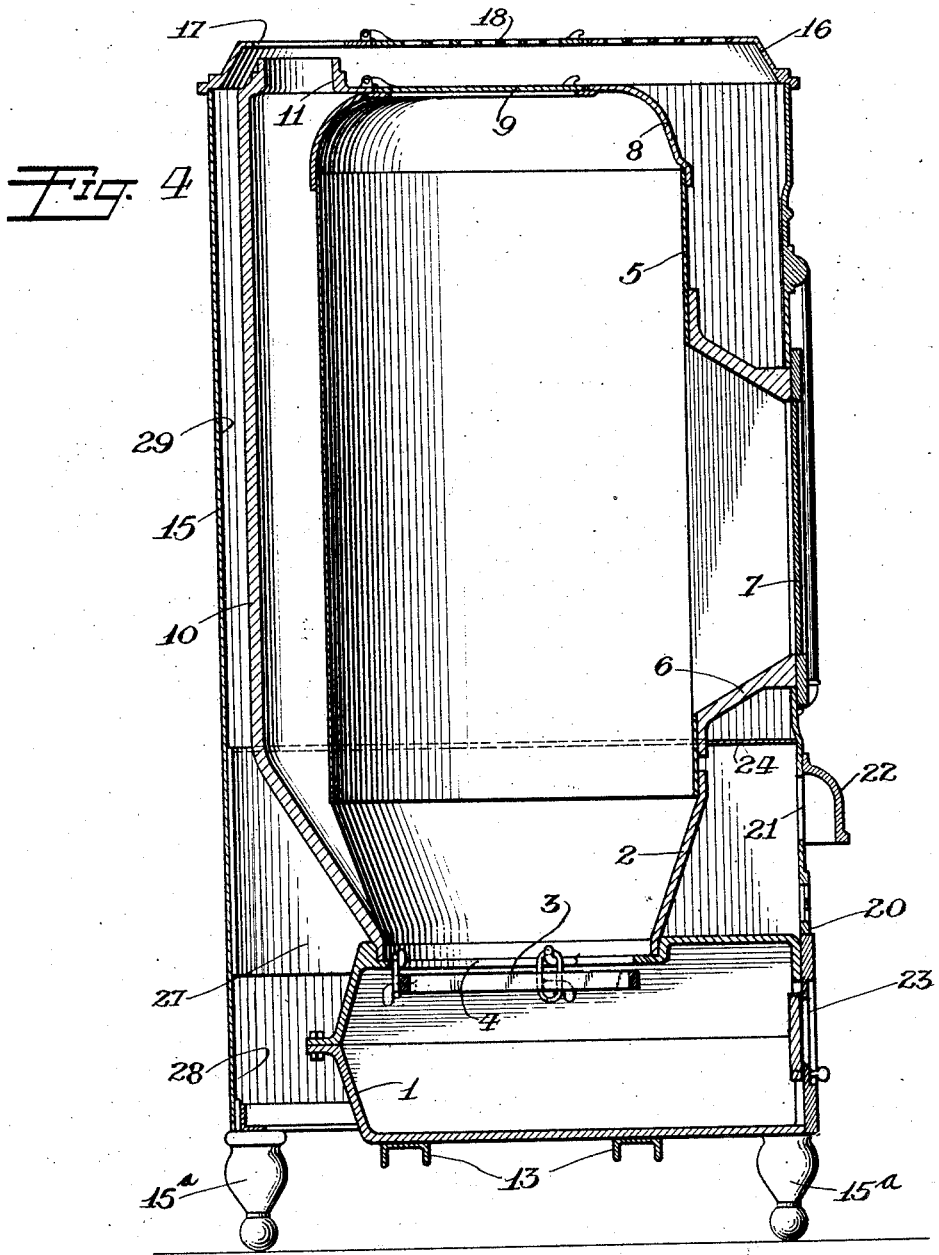

1,687,638

UNITED STATES PATENT OFFICE.

HENRY J. RUPP, OF QUINCY, ILLINOIS, ASSIGNOR TO GEM CITY STOVE MANUFACTURING CO., A CORPORATION OF ILLINOIS.

DOWNDRAFT HEATER.

Application filed November 2, 1927. Serial No. 230,560.

This invention relates to a heat circulating device and more particularly to a downdraft heater wherein the entire base is heated so that the incoming air, moving between the base of a heater unit and an outer enclosing casing, is rapidly heated and is then deflected by suitable baffles to cause discharge of the heated air through side and front louvers of the casing to direct a large volume of heated air to the floor surrounding the heater, thereby providing an unusually large volume of warm circulating air.

It is an object of this invention to provide an improved heat circulating unit, consisting of a down-draft stove, mounted within a casing or cabinet, and connected therewith by means of suitable hot air deflecting baffles.

It is also an object of this invention to provide an improved down-draft heater wherein an apertured baffle is positioned between an outer casing and a down-draft stove, enclosed within said casing, to afford an arrangement whereby a greater circulation of hot air is produced by causing part of the hot air to be deflected downwardly to warm the floor surrounding the heater while additional air is permitted to rise upwardly in the space provided between the upper portion of the stove and the casing and be discharged through the grilled top of said casing.

It is furthermore an object of this invention to provide an improved down-draft heater comprising a down-draft stove which is mounted within a heat circulating casing and which is connected therewith by suitable baffles whereby part of the heated air is directed downwardly around the floor area surrounding the heater while additional air is heated and permitted to pass upwardly between the stove and casing and out of the casing top, to provide an unusually large volume of warm circulating air.

It is an important object of this invention to provide a simplified arrangement of a down-draft circulator whereby unusually large volumes of warm circulating air may be produced by enclosing a down-draft stove within a casing, having suitable baffles positioned therein, whereby portions of the hot air are deflected downwardly out of the sides and front of the casing against the floor, while additional volumes of hot air are permitted to pass upwardly through the casing and out of the top thereof.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of an improved down-draft heater, embodying the principles of this invention, with parts of the heater broken away.

Figure 2 is a transverse horizontal section of the heater taken on line II—II of Figure 3.

Figure 3 is a vertical section of the heater taken on line III—III of Figure 2.

Figure 4 is a vertical section taken on line IV—IV of Figure 2.

As shown on the drawings:

The improved down-draft heater comprises a stove consisting of a base 1, upon which is supported a firepot 2, having a grate or grid 3 hung beneath the lower portion thereof upon a flange 4 forming a part of the base 1. The grate 3 is hung from the flange 4 by means of metal links engaged on lugs formed on the flange 4. Supported on the firepot 2 is a steel drum, cast iron combustion chamber or housing 5, having a front opening, surrounded by a fuel supply or intake hopper 6, the outer end of which is provided with a suitable closure door 7 having standard adjustable vanes of any desired type. The upper end of the cylindrical drum 5 is closed by means of a top section 8 having an opening in the upper central portion thereof adapted to be closed by means of a hingedly supported closure plate or cover 9. Forming a part of the rear of the firepot 2 is an upwardly directed flue 10, the upper end of which is slightly restricted and grooved to form a suitable support 11 for a flue pipe (not shown). Mounted on the rear portion of an upper casing chamber 15 is a humidifier or water pan 12, pivoted at 12ª and adapted to carry a quantity of water for humidifying purposes. The water pan may be tilted to permit replenishing of water.

The stove hereinbefore described has the base 1 thereof supported upon a plurality of bridge bars or yokes 13, the ends of which are supported in the lower end of a casing base chamber 14, which is supported above the floor by means of a plurality of legs 15ª. Formed on the upper end of the casing base chamber 14 is an upper casing chamber 15, having fitted on the upper end thereof a grilled top section 16 provided with a flue pipe opening 17 positioned directly above the flue pipe support 11, as illustrated in Figure 4. The grilled casing top 16 is also provided with a central opening which is closed by a hingedly supported grilled or apertured cover plate 18. Formed in the lower portion of each side of the upper casing chamber 15 is an air intake opening, having mounted therein an open air intake grid or apertured plate 19. The front of the upper casing chamber 15 is provided with a suitable opening into which the fuel intake hopper projects. The intake opening of the upper casing chamber is closed by means of the feed door 7, which also forms a part of the down-draft stove.

The casing surrounding the down-draft stove is separated therefrom by a suitable distance to afford a heat circulating space or chamber within the casing. The lower casing chamber 14 is constructed with each of the side walls and the front wall having a hot air outlet opening formed therein and partially closed by means of a hot air outlet grid or apertured plate 20. Provided in each of the side walls and front wall above the respective grid 20 is a hot air outlet opening 21, each of which is partially covered by means of a downwardly directed hood or louver 22. The base 1 of the stove is provided with a closure door 23 which also serves as a closure means for an opening provided in the lower portion of the front wall of the outer casing. The door 23 is provided with a standard adjustable grid of any desired type.

For the purpose of providing a greater circulation of the hot air produced by the enclosed stove, the interior of the lower portion of the casing is equipped with a horizontally disposed baffle plate 24 having a plurality of apertures 25 therein in the two side wings of the baffle plate. The baffle plate 24 extends across the front of the casing and rearwardly along each side thereof. The rear ends of the side wings of the baffle plate 24 terminate in a substantially diagonal edge 26, as clearly shown in Figure 2, with each of said edges having integrally formed or rigidly secured thereto a downwardly directed flange or apron 27 each of which extends downwardly to a point below the top of the stove base 1. The baffle plate 24, together with aprons 27 thereof, afford an arrangement whereby the interior of the heater casing is divided into a lower heat circulating chamber 28 and an upper heat circulating chamber 29.

The improved down-draft heater is constructed so that when a fire is started in the firepot 2 the base door 23 or the grid slots thereof may be opened any desired amount to produce a temporary updraft until the fire is properly started. When the fire has been started the base door 23 is closed and a down-draft through the firepot 2 is started by opening the draft vanes of the feed door 7. The down-draft arrangement in the encased stove causes the entire stove base 1 to become heated, thereby producing a large heating area close to the floor. The provision of the apertured baffles 24 within the casing affords an arrangement whereby the incoming air entering the open bottom of the casing base chamber 14 begins to heat immediately as it passes upwardly between the stove base 1 and the lower chamber 14 of the outer casing. By the time the entering air reaches the baffle plates between the casing and the top of the firepot said air is thoroughly heated. The heated air striking against the baffle plates 24 is deflected downwardly in the sides and front of the lower circulating chamber 28 of the casing and is directed or deflected through the louver openings 21 and the openings of the heat outlet grids or plates 20 in the sides and front of the casing, so that large volumes of warm air are directed against the floor for a considerable distance around the improved heater. Quantities of the heated air from the lower casing chamber 28 pass upwardly through the baffle openings 25 into the upper casing chamber 29, causing an upward circulation of air within the chamber 29 together with the warm air which is produced in the chamber 29 by the heated drum 5 of the stove. The upward draft of warm air in the chamber 29 causes a suction or intake of cold air through the upper casing chamber grids 19 at the sides of the casing. It will thus be noted that the cold air taken in through the grids 19 passes upwardly around the stove drum 5 and is heated in its upward passage through the chamber 29. All of the warm air within the casing above the baffle plates at the sides and front of the drum, together with the warm air passing upwardly from the lower casing chamber 28 between the aprons 27, is permitted to be discharged upwardly through the grilled top 16 and the grilled cover plate 18 thereof, thereby providing an unusually large volume of warm circulating air for the room within which the improved down-draft heater is positioned. By the use of the improved heater large quantities of warm air are therefore circulated upwardly through the grilled top of the casing, as well as downwardly out of the sides of the lower section of the casing to heat the floor for a considerable distance around the heater. The cold zone usually found around the floor of a stove or circulating heater is, therefore, entirely eliminated and an improved system of heat deflection and heat circulation is produced, with the water provided in the water pan 12 permitting the warm circulating air to be properly humidified.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A heat circulating device comprising a casing having air-escape openings therein, a stove mounted in said casing, baffle means between said casing and stove, dividing the interior of said casing into upper and lower chambers, and aprons formed on said baffle means.

2. The combination with a casing, of a down-shaft stove supported therein, louvers formed on said casing, grids mounted in said casing below said louvers and baffle means mounted within said casing adapted to deflect warm air outwardly through said louvers and through said grids.

3. The combination with a casing open at the bottom, of a grilled cover for said casing, a plurality of grids formed in the walls of said casing, louvers formed on said casing, and baffle means within said casing and around said stove to produce a deflection of warm air outwardly through said grids and louvers.

4. A heat circulating device comprising a casing open at the bottom and having a plurality of openings in the walls thereof, apertured plates closing a plurality of said openings, louvers formed on said casing over the remaining openings, a grilled top for said casing, a grilled cover plate hinged on said top to close an opening therein, cross bars mounted in the bottom of said casing, a down-draft stove mounted within said casing upon said cross bars, an apertured baffle in said casing above said louvers and surrounding said stove, and downwardly directed aprons formed on the ends of said baffle and projecting from said stove into the rear corners of said casing.

5. A heat circulating device comprising a casing open at its lower and upper ends, legs supporting said casing above the floor, supports formed in the lower end of said casing, a down-draft stove mounted within said casing upon said supports, a grilled cover for said casing, a flanged baffle member between said casing and stove dividing the interior of said casing into upper and lower chambers, air intake plates mounted in the walls of the upper portion of said casing above said baffle means, louvers formed on the lower portion of said casing below said baffle means, and a plurality of apertured air outlet plates mounted in the lower portion of the casing beneath said louvers.

6. The combination with a down-draft stove, of an apertured casing surrounding the same and supporting said stove above the floor, an apertured baffle mounted within said casing and extending substantially around the sides and front of said stove, aprons formed on said baffle at the rear of said stove, air intake grids mounted in the casing above said apertured baffle, louvers formed on said casing below said apertured baffle and air outlet grids in said casing below said louvers.

7. The combination with a casing having an open bottom and a grilled top, of a stove mounted therein, horizontal baffles mounted within said casing and fitted around said stove, and vertical aprons formed on said baffles at the back of said casing.

8. The combination with a down-draft stove, of a casing surrounding and supporting said stove above the floor, a baffle mounted in said casing and surrounding the two sides and front of said stove above the level of the stove firepot, and baffle members extending diagonally from the rear portion of said stove into the rear corners of said casing.

9. The combination with a casing having a grilled top, of a down-draft stove supported within said casing above the floor, a horizontal baffle mounted within said casing and surrounding both sides and front of said stove, said horizontal baffle having apertures in the side portions thereof, vertical baffles formed on the rear ends of said horizontal baffle and directed diagonally from the rear portion of the stove into rear corners of said casing, apertured air intake plates mounted in said casing above said horizontal baffle, air outlet plates mounted in said casing below said horizontal baffle, and a plurality of louvers formed on said casing beneath said horizontal baffle and above said air outlet plates.

10. The combination with a casing having door openings in the front thereof, of a down-draft stove mounted in said casing above the floor and having extensions fitting around the door openings in said casing, doors for said casing adapted to also serve as closures for stove door openings, apertured baffle means mounted between said casing and said stove, apertured air intake plates mounted in the sides of said casing above said baffle means, apertured air outlet plates mounted in the sides and front of said casing below said baffle means and louvers formed on the sides and front of said casing beneath said baffle means and above said air outlet plates.

11. The combination with a down-draft stove, of an apertured housing surrounding and supporting said stove above the floor, apertured deflecting means within said housing to cause a downward deflection of warm air in the lower portion of said housing, and diverging aprons formed on the ends of said means adapted to cause an upward circulation of warm air in the upper and rear portion of said housing.

In testimony whereof I have hereunto subscribed my name at Quincy, Adams County, Illinois.

HENRY J. RUPP.